United States Patent [19]

Abe et al.

[11] Patent Number: 5,219,188
[45] Date of Patent: Jun. 15, 1993

[54] CONSTRUCTION FOR PREVENTING INCOMPLETE CONNECTION OF PIPES

[75] Inventors: Takeshi Abe, Saitama; Mitsuo Kaishio, Ibaraki, both of Japan

[73] Assignee: Sanoh Kogyo Kabushiki Kaisha, Tokyo, Japan

[21] Appl. No.: 817,156

[22] Filed: Jan. 6, 1992

[30] Foreign Application Priority Data

Jan. 9, 1991 [JP] Japan .................... 3-3136[U]
Aug. 23, 1991 [JP] Japan .................. 3-66974[U]

[51] Int. Cl.⁵ .......................................... A16L 35/00
[52] U.S. Cl. ........................... 285/93; 285/319; 285/921; 285/39
[58] Field of Search .............. 285/319, 921, 86, 93, 285/39

[56] References Cited

U.S. PATENT DOCUMENTS

| | | | |
|---|---|---|---|
| 3,569,903 | 3/1971 | Brishka | 285/319 X |
| 4,035,005 | 7/1977 | De Vincent et al. | 285/319 |
| 4,730,856 | 3/1988 | Washizu | 285/319 |
| 4,923,228 | 5/1990 | Laipply | 285/319 |
| 4,944,536 | 7/1990 | Bartholomew | 285/319 |
| 5,069,424 | 12/1991 | Dennany | 285/319 X |

Primary Examiner—Dave W. Arola
Attorney, Agent, or Firm—McGlew & Tuttle

[57] ABSTRACT

Prevention of incomplete connection of pipes, and easy and visual checking for incomplete connection between the male and female members from the outside, and the prevention of dirt and dust from entering the connection are aimed. To attain these objects, provided is a construction for preventing incomplete connection of pipes which connects the male member having a flange-like projection at its external periphery to the female member having a retainer disposed at its internal periphery for locking the flange-like projection on the male member by inserting the male member a specified distance into the female member, the construction comprising a cylindrical member mounted on the male member for covering the external periphery at the opening side of female member and locking means disposed on the cylindrical member and the female member to lock the members, whereby the cylindrical member is locked to the female member by the locking means so that the cylindrical member covers the external periphery on the opening side of the female member when the male member is inserted the specified distance into the female member.

6 Claims, 11 Drawing Sheets

CONSTRUCTION FOR PREVENTING INCOMPLETE CONNECTION OF PIPES

FIELD OF THE INVENTION AND RELATED ART STATEMENT

This invention relates to a construction for preventing incomplete connection of pipes, for example, automobile fuel pipes and air tubes.

In general, automobile fuel pipes, air tubes, and other pipes are installed so that they pass through confined spaces between many components. For connecting these pipes easily, the end of one pipe has a male member having a flange-like projection at its external periphery, whereas the end of the other pipe has a female member having a retainer at its internal periphery for locking the flange-like projection of the male member, so that the male and female members are connected with single finger motion.

It is, however, difficult to check for the connection between the male and female members visually from the outside because the connection is made within the female member. If the connection is incomplete, fluid leakage may occur later, causing an unexpected accident.

Also, there is a gap in the connection between the male and female members, through which dirt and dust may enter the connection.

OBJECT AND SUMMARY OF THE INVENTION

This invention aims to solve these problems of the conventional art.

Accordingly, it is an object of this invention to provide a construction for preventing incomplete connection of pipes in which it is possible to easily check for such as incomplete connection between the male and female members from the outside and to prevent dirt and dust from entering the connection.

To attain the above object, in a construction for preventing incomplete connection of pipes which connects the male member having a flange-like projection at its external periphery to the female member having a retainer at its internal periphery for locking the flange-like projection on the male member by inserting the male member a specified distance into the female member, the construction comprises a cylindrical member mounted on the male member for covering the external periphery at the opening side of female member and locking means disposed on the cylindrical member and the female member to lock the members, whereby the cylindrical member is locked to the female member by the locking means so that the cylindrical member covers the external periphery at the opening side of the female member when the male member is inserted the specified distance into the female member.

According to this invention, since the cylindrical member mounted on the male member is locked to the female member only when the male member is completely connected to the female member, the complete connection of pipes can be checked visually by observing whether the cylindrical member is locked.

Also, since the cylindrical member is locked so as to cover the external periphery at the opening side of female member, it serves for filling the gap in the connection to prevent dirt and dust from entering the connection.

The locking means for locking the cylindrical member to the female member is constructed so that a locking hole is disposed in the cylindrical member and a locking projection for engaging with the locking hole in the cylindrical member is disposed at a part of the external periphery of female member.

Alternatively, the locking means for locking the cylindrical member to the female member is constructed so that a locking pawl is disposed at the tip end of cylindrical member and a locking step portion for locking the locking pawl of cylindrical member is disposed at the external periphery of female member.

DETAILED DESCRIPTION OF PREFERRED EMBODIMENTS

Figure 1:
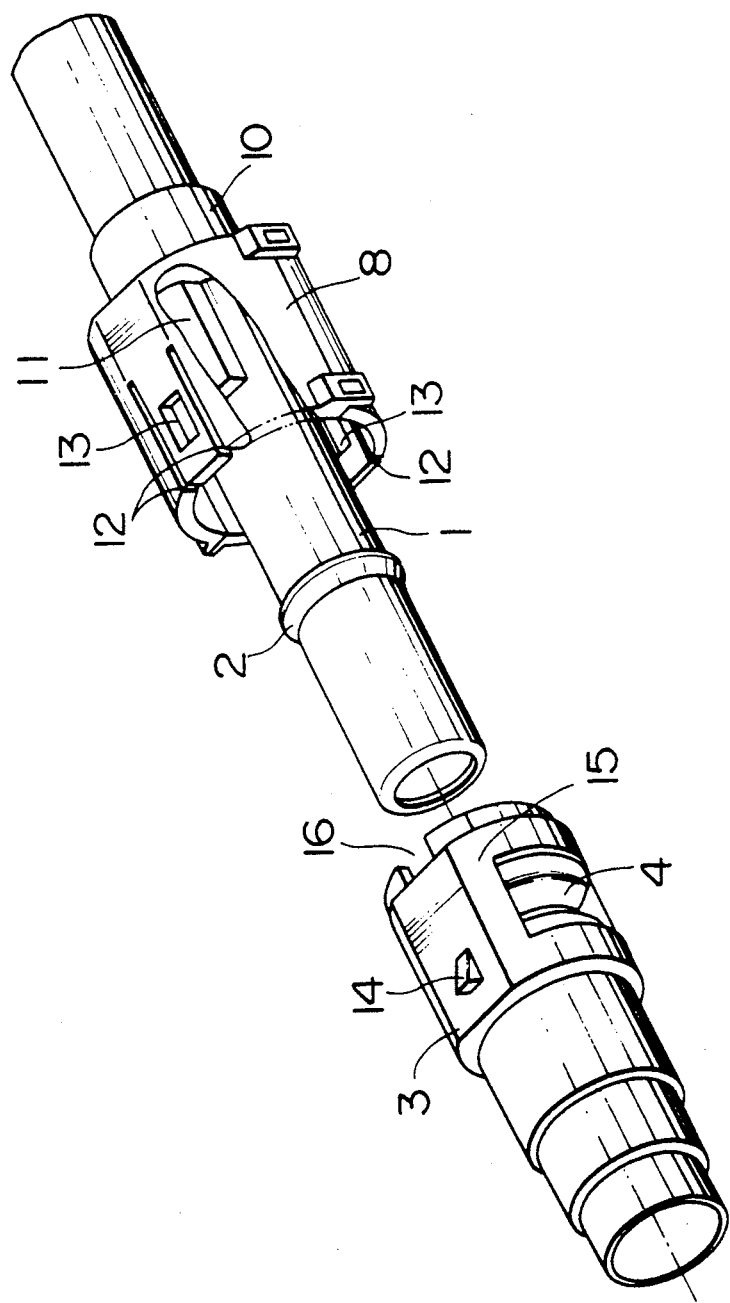
FIG. 1 is a perspective view of a first embodiment of this invention.
Figure 2:
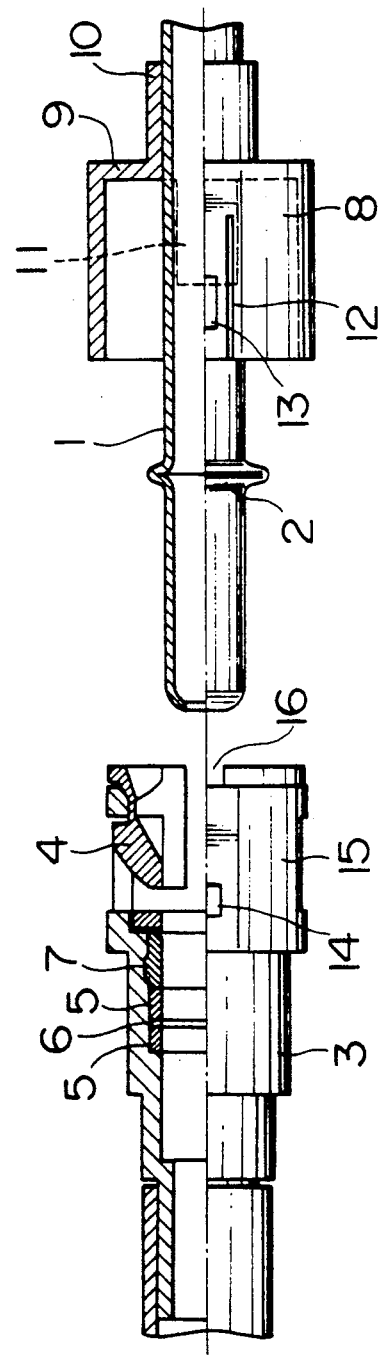
FIG. 2 is a partially sectional view of the first embodiment of this invention.

The embodiments of this invention will be described in detail with reference to the accompanying drawings. FIGS. 1 through 13 show the first embodiment of this invention, whereas FIGS. 14 through 23 show the second embodiment of this invention.

First, the first embodiment will be described with reference to FIGS. 1 through 13.

Referring to the figures, reference numeral 1 denotes a cylindrical male member having a flange-like projection 2 at its external periphery. Reference numeral 3 denotes a female member having a pair of right and left (upper and lower in FIG. 2) locking pawls 4 disposed at its internal periphery for locking the flange-like projection 2.

The above-described male member 1 and the female member 3 are so constructed that the locking pawls 4 in the female member 3 lock the flange-like projection 2 on the male member 1 when the male member 1 is inserted a specified distance into the female member 3, so that the male member 1 is connected to the female member 3.

In the figures, reference numeral 5 denotes an O-ring for ensuring tight sealing of the connected members 1 and 3, 6 denotes a spacer, and 7 denotes a stopper for holding the O-rings 5 and the spacer 6 at a specified position within the female member 3.

Reference numeral 8 denotes a cylindrical member mounted on the male member 1. The cylindrical member 8 comprises a bottom wall 9 at one end, a cylindrical portion 10 protruding outwardly through the bottom wall 9, and a pair of upper and lower projections 11 which connect to the cylindrical portion 10 and protrude into the cylindrical member 8.

At the other end of cylindrical member 8, locking holes 13 having slits 12 at their right and left are disposed at the upper and lower (front and rear in FIG. 2) portions of cylindrical member 8. Whereas, locking projections 14 for engaging with the locking holes 13 are mounted at an external periphery 15 at the opening side of the female member 3.

The cylindrical member 8 is so designed that its inside diameter is nearly equal to the outside diameter of opening 16 of the female member 3, and its length is large enough to cover the external periphery 15 at the opening side of the female member 3.

Also, the cylindrical portion 10 protruding outwardly from the cylindrical member 8 is so designed that its inside diameter is nearly equal to the outside diameter of the male member 1, and its length is large enough for the end of cylindrical portion to abut and extend in the right and left directions a pair of locking pawls 4 disposed within the female member 3 when the cylindrical portion 10 is inserted into the female member 3 through the opening 16.

Furthermore, the locking holes 13 and the locking projections 14 disposed on the cylindrical member 8 and the female member 3, respectively, are arranged so as to engage with each other so that the cylindrical member 8 covers the external periphery 15 at the opening side of the female member 3 when the male member 1 is inserted a specified distance into the female member 3.

A pair of upper and lower projections 11 protruding in the cylindrical member 8 is so designed that its end abuts the flange-like projection 2 without engaging with the locking pawls 4 disposed on the female member 3 when the locking projections 14 engage with the locking holes 13.

Figure 3:
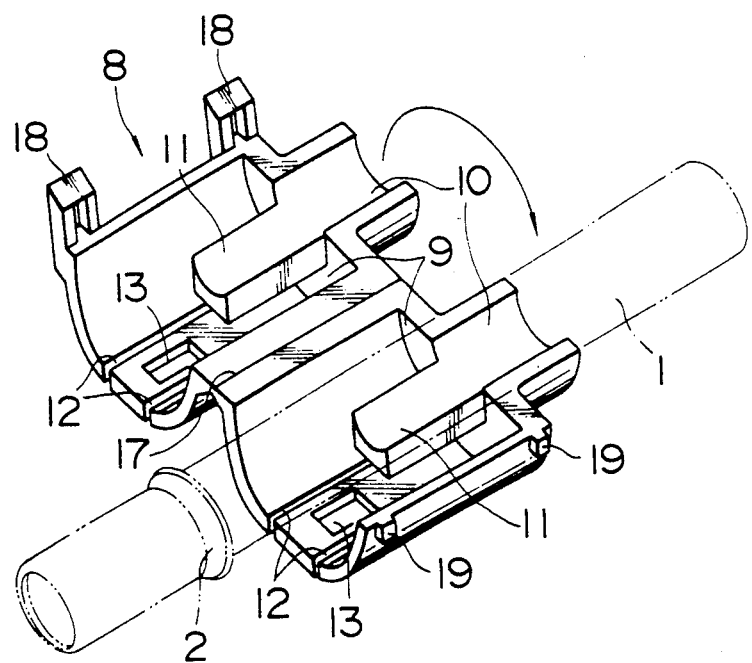
FIG. 3 is a perspective view of cylindrical member used in the first embodiment of this invention.

The cylindrical member 8 of the above construction, which is separated into halves as shown in FIG. 3, is combined via a thin-wall hinge portion 17 connecting the halves so that the cylindrical portion 10 of cylindrical member 8 grasps the male member 1, and assembled so as to be mounted on the male member 1 by putting the locking holes 18 and the locking projections 19 disposed at the end of each half into engagement.

Next, the connecting operation of the first embodiment of this invention constructed as described above will be explained with reference to FIGS. 4 through 10.

Figure 4:
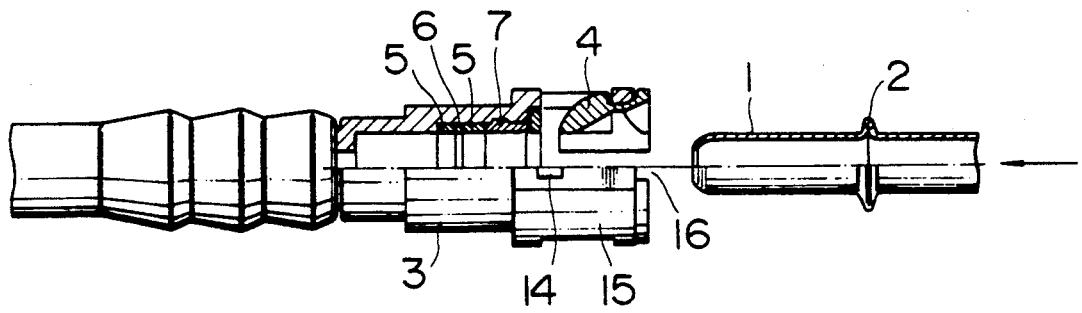
FIGS. 4 through 10 are partially sectional views showing the connecting operation of male and female members in the first embodiment of this invention.
Figure 5:
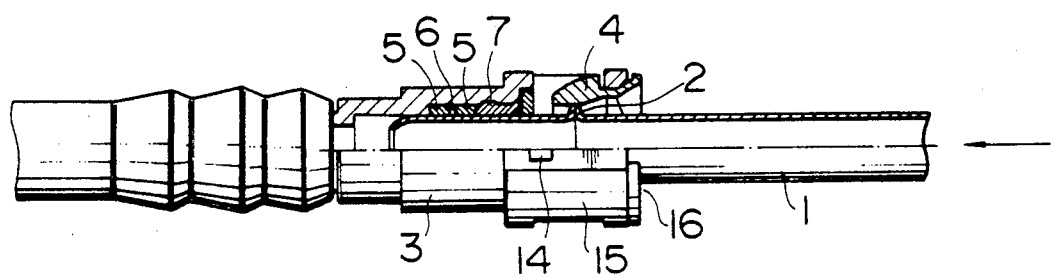
Figure 6:
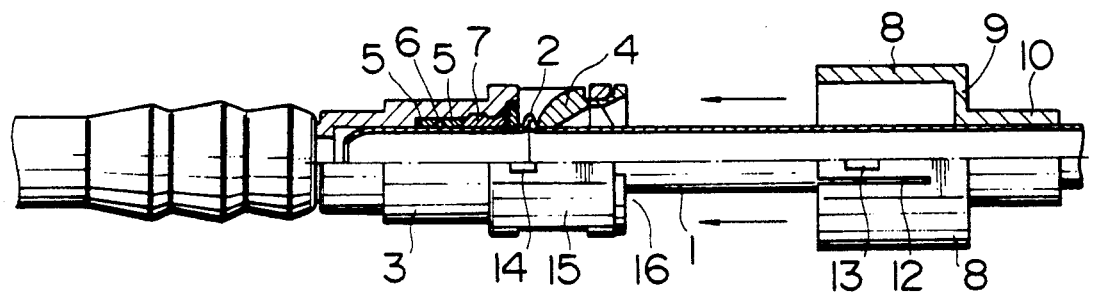

First, the male member 1 is inserted into the female member 3 through the opening 16, and the flange-like projection 2 disposed on the male member 1 is locked by the locking pawls 4 disposed in the female member 3 (refer to FIGS. 4 through 6).

Figure 7:
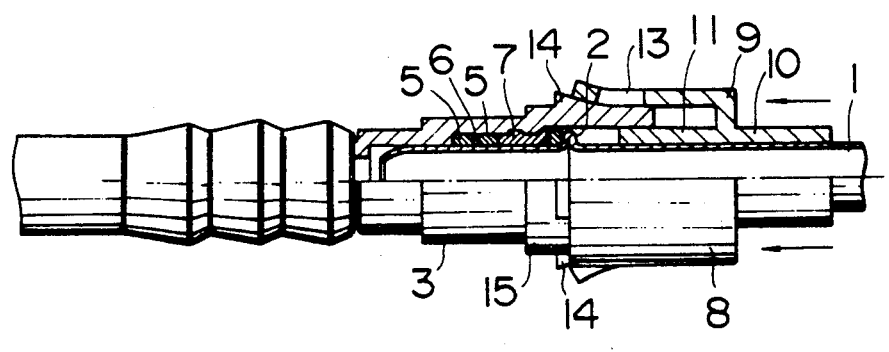
Figure 8:
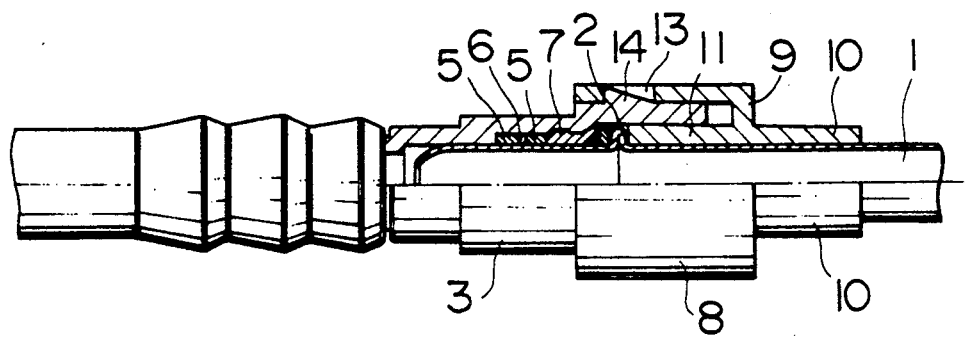

Next, the cylindrical member 8 mounted on the male member 1 is slided along the outside wall of the male member 1 and pushed until the locking holes 13 in the cylindrical member 8 engage with the locking projections 14 disposed at the external periphery 15 on the opening side of the female member 3 which has been connected to the male member 1 (refer to FIGS. 7 and 8).

Figure 9:
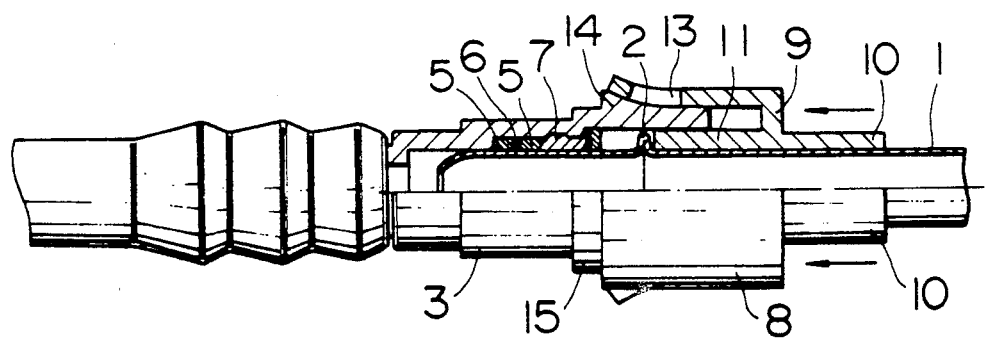

If the connection between the male member 1 and the female member 3 is incomplete, the projections 11 protruding in the cylindrical member 8 abut the flange-like projection 2 on the male member 1 which has not been inserted the specified distance, so that the movement of cylindrical member 8 is inhibited, making impossible the engagement of the cylindrical member 8 with the female member 3 (refer to FIG. 9).

Therefore, the complete connection between the male member 1 and the female member 3 can be checked visually by observing whether the cylindrical member 8 is engaged with the female member 3.

Figure 10:
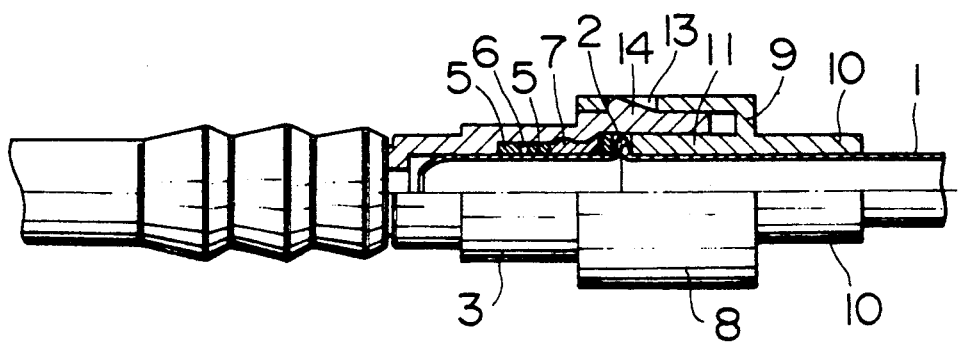

Even if the connection between the male member 1 and the female member 3 is incomplete, by more strongly pushing the cylindrical member 8 mounted on the male member 1, the projections 11 of the cylindrical member 8 force the flange-like projection 2 disposed on the male member 1 into the female member 3; as a result, the connection between the male member 1 and the female member 3 and the engagement of the cylindrical member 8 and the female member 3 are completed at the same time (refer to FIGS. 9 and 10).

Next, the releasing operation of the male member 1 and the female member 3 which have been connected by the abovedescribed operation will be described with reference to FIGS. 11 through 13.

First, the cylindrical member 8 which has been engaged with the female member 3 is slid out of the female member 3 by unlocking the locking means 13, 14. Then, the cylindrical member 8 is disassembled into two halves by unlocking the locking means 18, 19, and removed from the female member 3.

Figure 11:
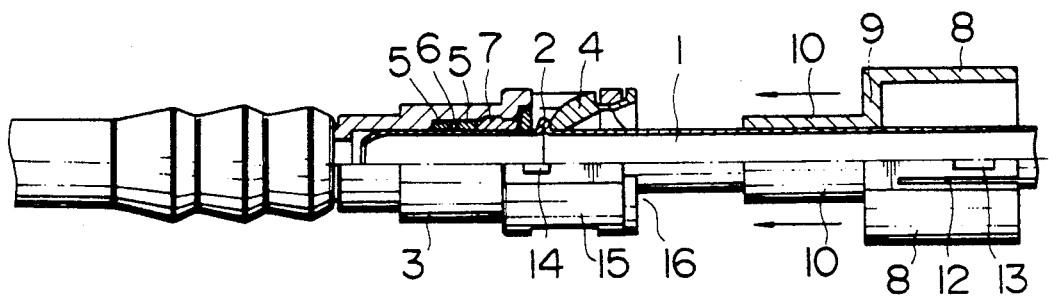
FIGS. 11 through 13 are partially sectional views showing the releasing operation of male and female members in the first embodiment of this invention.

Next, the cylindrical member 8 is mounted again on the male member 1 with the cylindrical portion 10 protruding outwardly from the cylindrical member 8 facing toward the opening 16 of the female member 3 which has been connected to the male member 1 (refer to FIG. 11).

Figure 12:
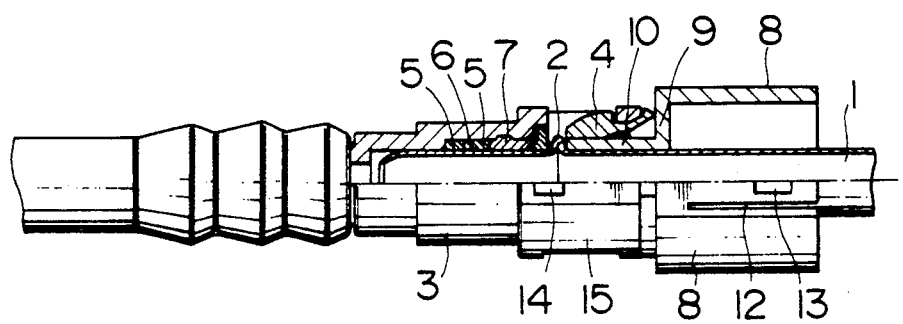
Figure 13:
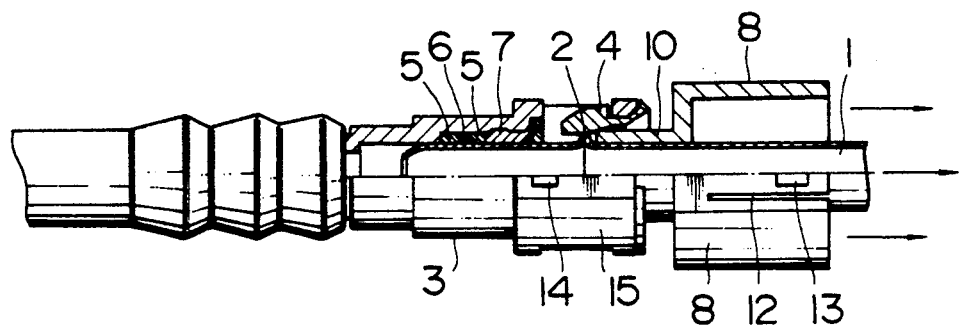
Figure 14:
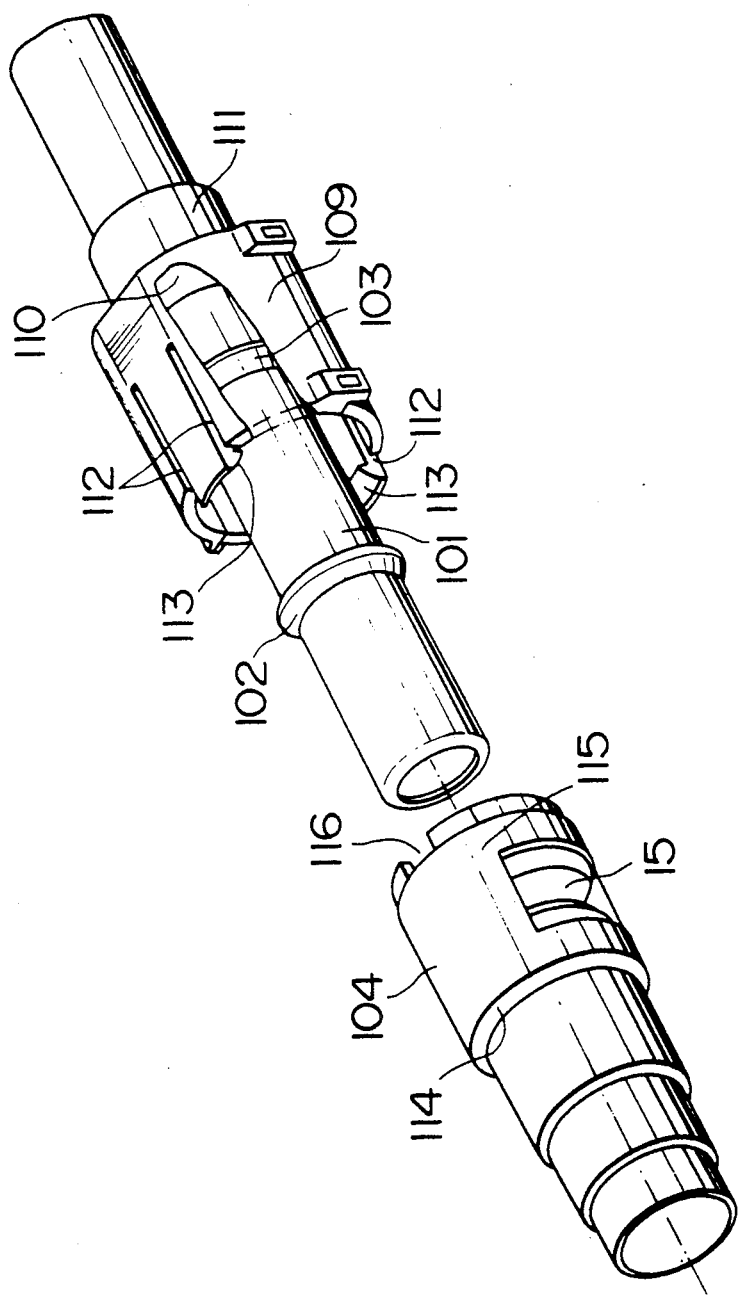
FIG. 14 is a perspective view of a second embodiment of this invention.
Figure 15:
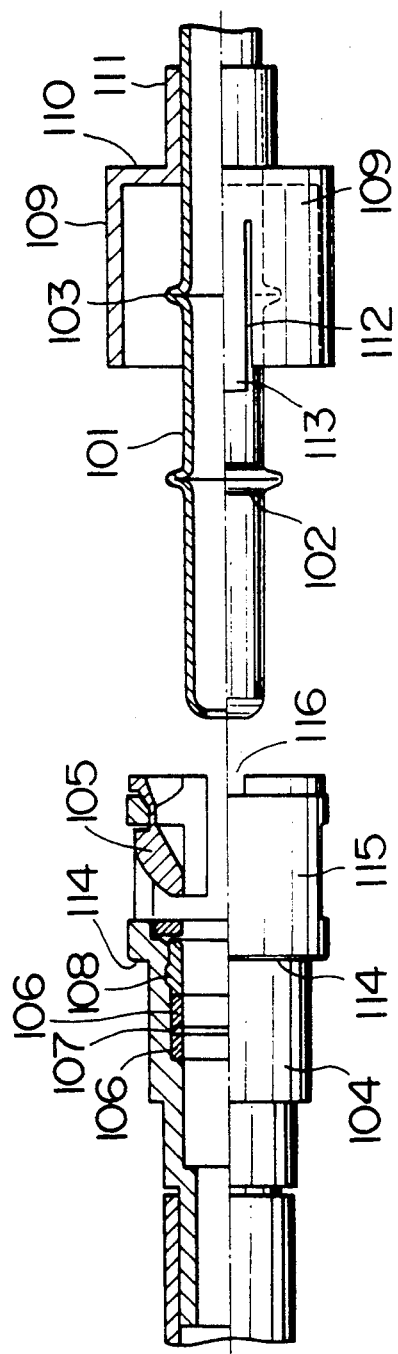
FIG. 15 is a partially sectional view of the second embodiment of this invention.

After that, the cylindrical portion 10 of the mounted cylindrical member 8 is inserted into the female member 3 through the opening 16, so that the end of cylindrical portion 10 spread the locking pawls 4 disposed in the female 3 to release the flange-like projection 2 on the male member 1 (refer to FIG. 12).

The released male member 1 can be withdrawn together with the cylindrical member 8 from the female member 3. The releasing operation is now complete (refer to FIG. 13).

The above has been the explanation of the first embodiment of this invention.

Next, the second embodiment of this invention will be described with reference to FIGS. 14 through 23.

Referring to the figures, reference numeral 101 denotes a male member having a first flange-like projection 102 and a second flange-like projection 103 at its external periphery. Reference numeral 104 denotes a female member having a pair of right and left (upper and lower in FIG. 15) retainers 105 disposed at its internal periphery for locking the first flange-like projection 102.

The above-described male member 101 and the female member 104 are so constructed that the retainers 105 in the female member 104 lock the first flange-like projection 102 on the male member 101 when the male member 101 is inserted a specified distance into the female member 104, so that the male member 101 is connected to the female member 104.

In the figures, reference numeral 106 denotes an O-ring for ensuring tight sealing of the connected members 101 and 104, 107 denotes a spacer, and 108 denotes a stopper for holding the O-rings 106 and the spacer 107 at a specified position within the female member 104.

Reference numeral 109 denotes a cylindrical member mounted on the male member 101. The cylindrical member 109 comprises a bottom wall 110 at one end and a cylindrical portion 111 protruding outwardly through the bottom wall 110.

At the other end of cylindrical member 109, locking pawls 113 having slits 112 at their right and left are disposed at the upper and lower (front and rear in FIG. 15) portions of cylindrical member 109. Whereas, a locking step portion 114 for engaging with the locking pawls 113 is mounted at an external periphery 115 at the opening side of the female member 104.

The cylindrical member 109 is so designed that its inside diameter is nearly equal to the outside diameter of opening 116 of the female member 104, and its length is large enough to cover at least the end of the external periphery 115 at the opening side of the female member 104.

Also, the cylindrical portion 111 protruding outwardly from the cylindrical member 109 has an inside diameter nearly equal to the outside diameter of the male member 101.

Furthermore, the locking pawls 113 and the locking step portion 114 disposed on the cylindrical member 109 and the female member 104, respectively, are arranged so as to engage with each other so that the cylindrical member 109 covers the external periphery 115 on the opening side of the female member 104 when the male member 101 is inserted the specified distance into the female member 104.

The bottom wall 110 of the cylindrical member 109 is so designed as to abut the second flange-like projection 103 on the male member 101 when the locking pawls 113 engage with the locking step portion 114.

Figure 16:
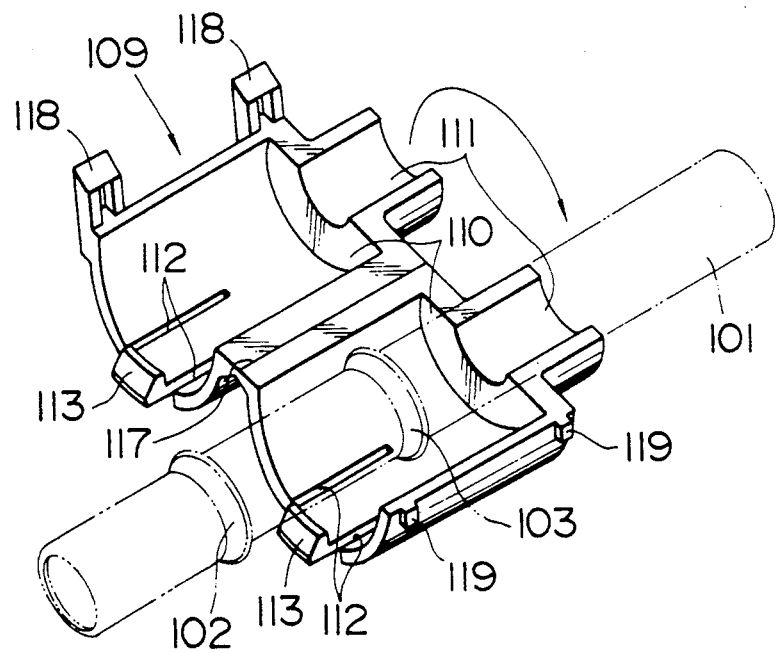
FIG. 16 is a perspective view of cylindrical member used in the second embodiment of this invention.

The cylindrical member 109 of the above construction, which is separated into halves as shown in FIG. 16, is combined via a thin-wall hinge portion 117 connecting the halves so that the cylindrical portion 111 of cylindrical member 109 grasps the male member 101, and assembled so as to be mounted on the male member 101 by putting the locking holes 118 and the locking projections 119 disposed at the end of each half into engagement.

Next, the connecting operation of the second embodiment of this invention constructed as described above will be explained with reference to FIGS. 17 through 23.

Figure 17:
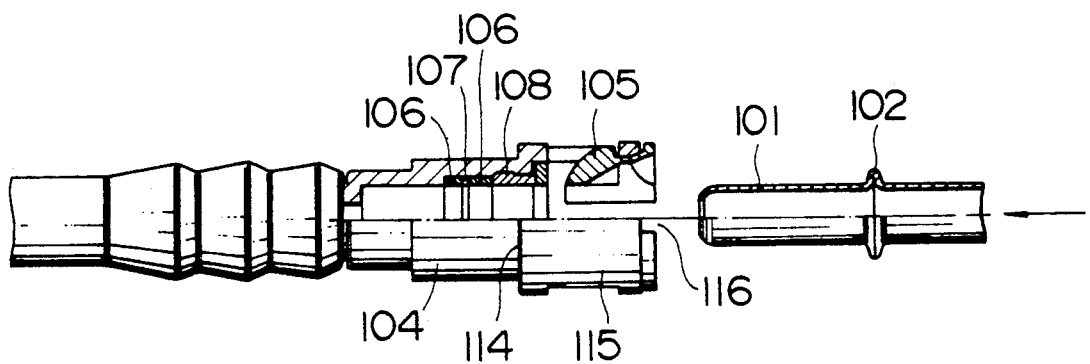
FIGS. 17 through 23 are partially sectional views showing the connecting operation of male and female members in the second embodiment of this invention.
Figure 18:
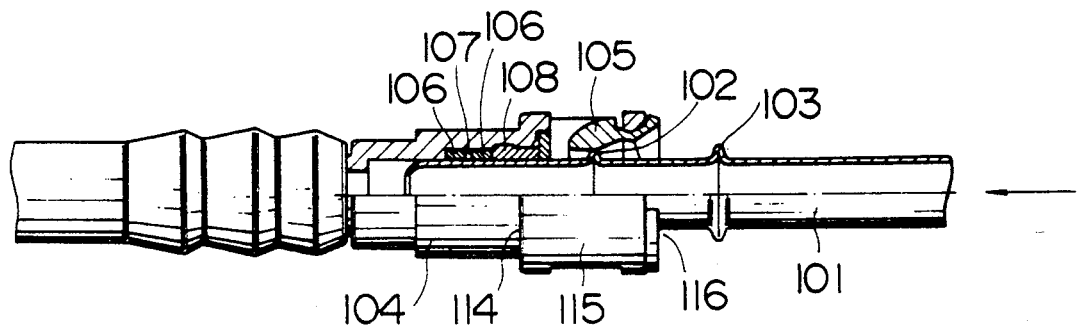
Figure 19:
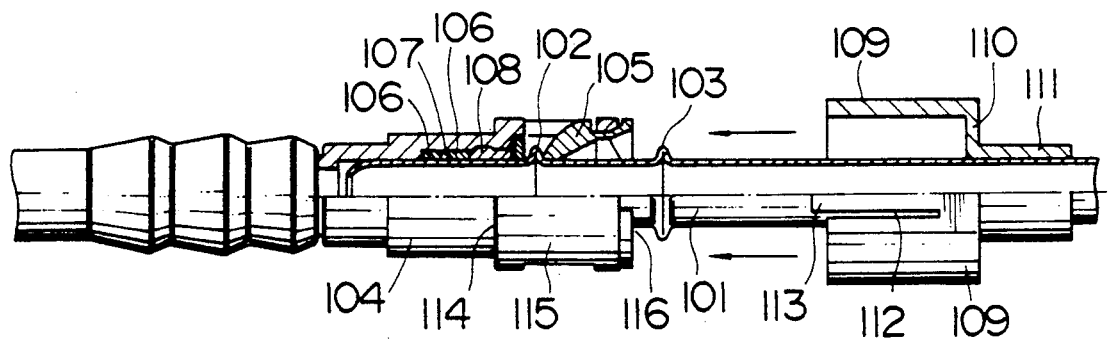

First, the male member 101 is inserted into the female member 104 through the opening 116, and the first flange-like projection 2 disposed on the male member 101 is locked by the retainers 105 disposed in the female member 104 (refer to FIGS. 17 through 19).

Figure 20:
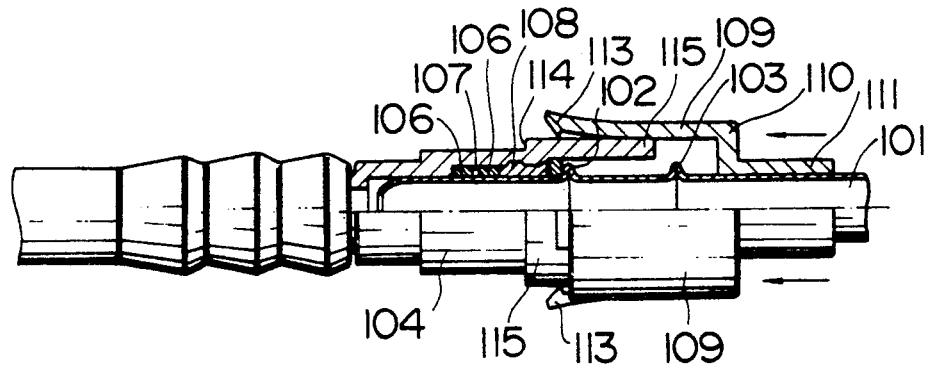
Figure 21:
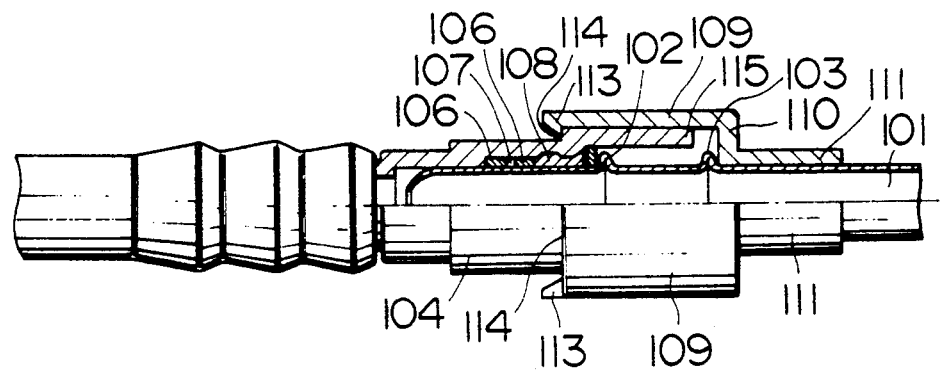

Next, the cylindrical member 109 mounted on the male member 101 is slided along the outside wall of the male member 101 and pushed until the locking pawls 113 in the cylindrical member 109 engage with the locking step portion 114 disposed at the external periphery 115 on the opening side of the female member 104 which has been connected to the male member 101 (refer to FIGS. 20 and 21).

In this operation, the cylindrical member 109 can be engaged with the female member 104 irrespective of the insertion condition in the circumferential direction of the cylindrical member 109 since both of the members 104 and 109 are circular.

Figure 22:
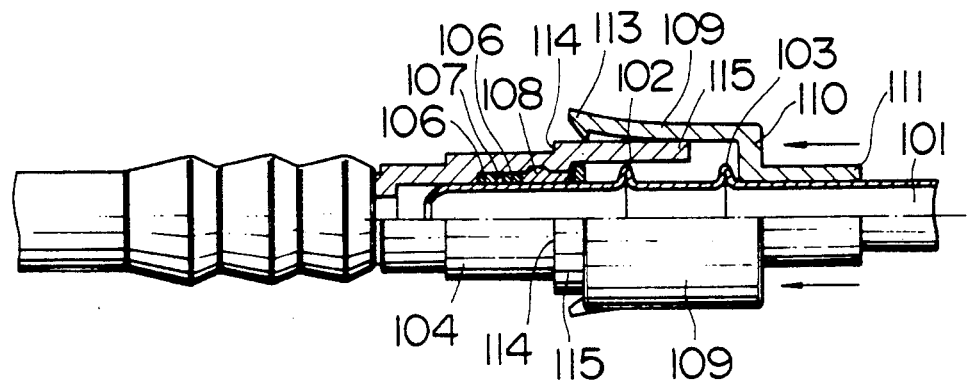

If the connection between the male member 101 and the female member 104 is incomplete, the bottom wall 110 of the cylindrical member 109 abuts the second flange-like projection 103 on the male member 101 which has not been inserted the specified distance, so that the movement of cylindrical member 109 is inhibited, making impossible the engagement of the cylindrical member 109 with the female member 104 (refer to FIG. 22).

Therefore, the complete connection between the male member 101 and the female member 104 can be checked visually by observing whether the cylindrical member 109 is engaged with the female member 104.

Figure 23:
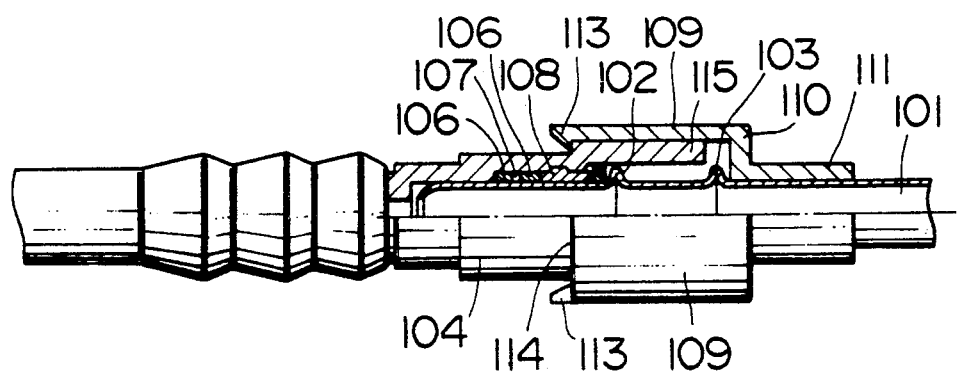

Even if the connection between the male member 101 and the female member 104 is incomplete, by more strongly pushing the cylindrical member 109 mounted on the male member 101, the bottom wall 110 of the cylindrical member 109 abuts the second flange-like projection 103 disposed on the male member 101 and forces the male member 101 into the female member 104; as a result, the connection between the male member 101 and the female member 104 and the engagement of the cylindrical member 109 and the female member 104 are completed at the same time (refer to FIGS. 22 and 23).

Having described two specific embodiments of this invention, it is to be understood that the invention is not limited thereto, and many modifications and variations of the present invention are possible in the light of the above teachings.

For example, in the above embodiments, the cylindrical member which covers the external periphery at the opening side of the female member is constructed so as to be separated into halves and provided with the cylindrical portion protruding outwardly, but such a construction is not always necessary. The cylindrical member may be shaped and constructed otherwise as long as it can cover the external periphery at the opening side of the female member and can be slidably mounted on the male member.

However, if the cylindrical member is constructed so as to be separated into halves as described in the above embodiments, only the cylindrical member can be removed after the pipes have been connected; and if the cylindrical portion is installed, the connection between the male and female members can be stabilized. Particularly in the first embodiment, the cylindrical portion can be used to release the male member from the female member as described earlier.

The connecting construction between the male member and the female member described in the above embodiment is only an example. As long as the two members can be connected by single finger motion by inserting the male member a specified distance into the female member, various, publicly known constructions can be used.

We claim:

1. A pipe connection construction for preventing incomplete connection of pipes, comprising: a male member having a radially outer peripheral surface with a flange-like projection; a female member having a radially inwardly directed retainer for locking said flange-like projection upon inserting said male member a specified distance into said female member; a cylindrical member mounted on said male member and positionable for covering an external periphery of said female member; a first locking hole formed on said cylindrical member, and a first locking projection formed on a part of said external periphery on said female member for locking said cylindrical and female members, and means positioning said first locking hole and said first locking projection for forming a locked condition when said male member is inserted said specified distance into said female member, said cylindrical member being formed of two divided parts connected by a hinge portion, said hinge portion being disposed in a longitudinal direction allowing said cylindrical member to open and close; and a second locking hole disposed at an end of one of said two divided parts and a second locking projection disposed at an end of another of said two divided parts for securing together said two divided parts.

2. A pipe connection construction according to claim 1, wherein said cylindrical member includes a bottom wall at one end;

and said positioning means includes a cylindrical portion extending from said bottom wall of said cylindrical member in an axial direction;

said cylindrical member includes third projection extending inside said cylindrical member from said bottom wall;

said third projection being provided for pushing in said flange-like projection, said third projection having a length, allowing said flange-like projection to become engaged when said third projection pushes said flange-like projection into a locking position with said first locking pawl.

3. A pipe connection construction according to claim 1, wherein said cylindrical member comprises a bottom wall at one end;

and said positioning means includes said male member having a second flange-like projection, said second flange-like projection being disposed at a given distance away from said flange-like projection, said second flange-like projection for engaging said bottom wall of said cylindrical member, a distance between said flange-like projection and said second flange-like projection, being determined to bring said flange-like projection and said first locking pawl into engagement when said second flange-like projection is urged by said bottom wall of said cylindrical member.

4. A pipe connection construction for preventing incomplete connection of pipes, comprising:

a male member having an outer peripheral surface with a flange-like projection;

a female member having a radially inwardly directed first locking pawl for locking said flange-like projection upon inserting said male member a specified distance into said female member;

a cylindrical member mounted on said male member and positionable for covering an external periphery of said female member by inserting said male member into said female member;

second locking pawl disposed at an end of said cylindrical member;

a locking step portion, for engaging said second locking pawl, disposed at said external periphery of said female member; and means positioning said second locking pawl and said locking step portion for forming a locked condition when said male member is inserted said specified distance into said female member;

said cylindrical member being formed of two divided parts connected by a hinge portion, said hinge portion being disposed in a longitudinal direction allowing said cylindrical member to open and close;

and cylindrical member having second locking hole and second locking projection disposed at an end of each of said two divided parts for securing together said two divided parts.

5. A pipe connection construction according to claim 4, wherein said cylindrical member includes a bottom wall at one end;

and said positioning means includes a cylindrical portion extending from said bottom wall of said cylindrical member in an axial direction;

said cylindrical member includes third projection extending inside said cylindrical member from said bottom wall;

said third projection being provided for pushing in said flange-like projection, said third projection having a length, allowing said flange-like projection to become engaged when said third projection pushes said flange-like projection into a locking position with said first locking pawl.

6. A pipe connection construction according to claim 4, wherein said cylindrical member comprises a bottom wall at one end;

and said positioning means includes said male member having a second flange-like projection, said second flange-like projection being disposed at a given distance away from said flange-like projection, said second flange-like projection for engaging said bottom wall of said cylindrical member, a distance between said flange-like projection and said second flange-like projection, being determined to bring said flange-like projection and said first locking pawl into engagement when said second flange-like projection is urged by said bottom wall of said cylindrical member.

* * * * *